Jan. 8, 1935.   C. H. ANDREWS   1,987,501
POOL AERATOR
Filed Sept. 1, 1933
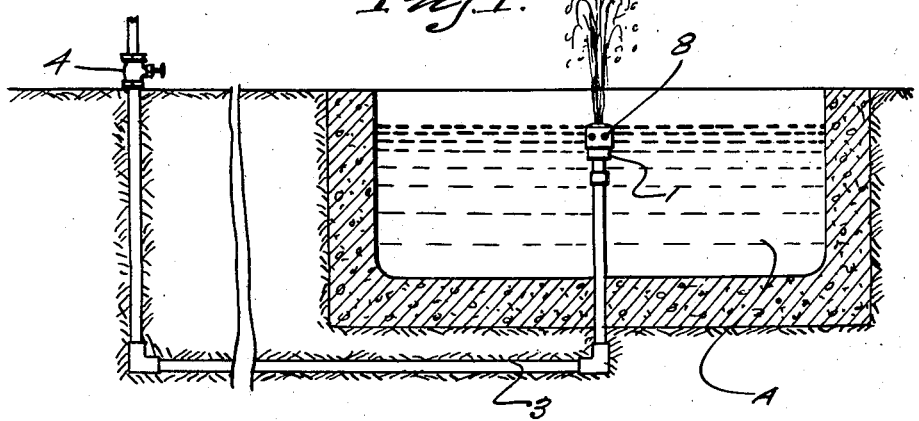
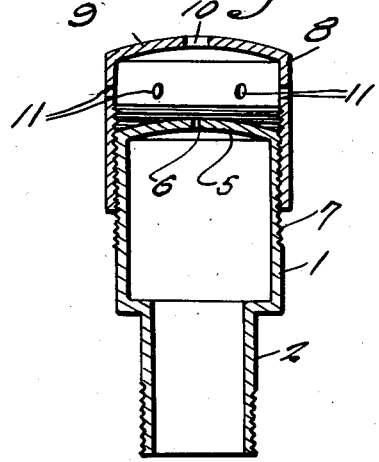
Inventor
C. H. Andrews
By Clarence A. O'Brien
Attorney Patented Jan. 8, 1935

1,987,501

UNITED STATES PATENT OFFICE 1,987,501

POOL AERATOR

Charles H. Andrews, New Castle, Pa.

Application September 1, 1933, Serial No. 687,882

1 Claim. (Cl. 210—26)

This invention relates to a pool aerator, the general object of the invention being to provide means for lifting and throwing water from pools, ponds, springs, lakes and other bodies of water into the air in a mist or fountain effect, so that the water will be aerated and thus purified and at the same time the geyser of water makes a beautiful effect.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a sectional view showing the invention in use on a pool of water.

Figure 2 is a vertical sectional view of the nozzle device.

As shown in these views, the device comprises a cylinder 1 having a neck 2 at its lower end for attachment to a supply pipe 3 provided with a valve 4 and leading to any suitable source of supply under pressure, such as a city main.

The cylinder 1 has a slightly rounded upper end 5 which is provided with a centrally arranged hole 6 and said cylinder is threaded, as at 7, to receive the cap 8 which is also provided with a slightly rounded upper end 9 having a hole 10 centrally arranged therein and of larger diameter than the hole 6 and in alignment with said hole 6. The cap is so placed on the cylinder 1 that a chamber is formed between the top of the cap and the top of the cylinder, as shown in Figure 2, and said cap is formed with the holes 11 in its sides which communicate with the chamber.

As shown in Figure 1, the device can be so placed in the body of water A that the holes 11 are in communication with the water so that the stream of water passing from the supply through the holes 6 and 10 will create a vacuum in the chamber formed by the cap so that the water from the pond or other body of water will be drawn through the holes 11 and will be carried upwardly through the hole 10 by the stream of water passing from the hole 10 and thus provide a fountain effect, as shown in Figure 1, and at the same time the water will be aerated by mixing with the air.

This device will aerate bodies of water so that fish and other living things will be benefited and it can be used for making fresh stagnant water and the height of the stream of water cast into the air can be regulated by the valve 4 and the amount of water entering the chamber through the holes 11 can be regulated by plugging up some of the holes. In fact, by controlling the size of the pressure opening and the size of the outlet from the upper chamber, a varied effect can be had as to the spray effect of the water. Then add to this, the change of pressure by the valve 4, all kinds of geyser, spray or other water effects can be secured.

The device can also be used to empty the pool by pointing the device at an angle and adjusting the parts to cast a solid stream into a chute or other means for carrying off the water. Fountains can be installed at small cost and run at low expense on account of the very small amount of water that is used under pressure.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A device of the class described comprising a cylinder having its upper end closed with a hole in the center of said upper end, means for connecting the cylinder to a supply of fluid under pressure, a cap threaded to the cylinder and forming a chamber between itself and the cylinder, the upper end of the cap having a centrally arranged opening therein of larger diameter than the hole in the cylinder and in alignment with said hole and the sides of the cap having holes therein placing the chamber in communication with a body of water in which the device is placed.

CHARLES H. ANDREWS.